United States Patent
Putthoff

[11] 3,724,118
[45] Apr. 3, 1973

[54] FISHING LURE

[76] Inventor: George F. Putthoff, 7146 Lydia, Kansas City, Mo. 64131

[22] Filed: May 26, 1971

[21] Appl. No.: 146,905

[52] U.S. Cl..............................43/42.06, 43/42.35
[51] Int. Cl. .............................................A01k 85/00
[58] Field of Search.....43/42.06, 42.22, 42.35, 43.14

[56] References Cited

UNITED STATES PATENTS

| 2,445,523 | 7/1948 | Goldbach | 43/42.06 |
| 2,546,516 | 3/1951 | Nardi | 43/42.06 |
| 2,791,058 | 5/1957 | Bettini | 43/42.06 |
| 1,854,696 | 4/1932 | Herington | 43/42.06 |

Primary Examiner—Louis G. Mancene
Assistant Examiner—Daniel J. Leach
Attorney—Alfred R. Fuchs

[57] ABSTRACT

A fishing lure that has an elongated body portion that has a cylindrical hollow mid-portion and solid tapering end portions, the front end being concavely curved so as to form a lower lip that projects further than an upper lip. The lure has a port at the bottom forward end of an air chamber provided in the cylindrical mid-portion, and a vent at the rear top of this chamber, which vent is slightly greater than the port. The forward end portion has an eye for attaching a line that is nearer the top than the bottom of the forward end.

5 Claims, 5 Drawing Figures

INVENTOR
GEORGE F. PUTTHOFF
BY Alfred R. Fuchs
ATTORNEY

FISHING LURE

It is the purpose of my invention to provide a fishing lure that is of a similar shape to a fish and which is provided with an air chamber so located and provided with a port and a vent that the lure will float first when cast into the water and be located in a substantially horizontal position near the surface of the water, but will rapidly fill with water that will enter through the port as air is discharged through the vent, so that the lure will sink rapidly from its floating position near the surface. This is an action of a fishing lure that I have found desirable for bass, which are attracted to a lure that goes through such a performance.

It is the further purpose of my invention to provide a fishing lure that will first have a position in the water that is substantially a floating position on or at the surface of the body of water and which will rapidly sink from this position while remaining in a substantially horizontal position in the body of water, which will perform this action by the filling of a mid-portion of the body of the lure with water and which can be quickly put back into a floating position by pulling the lure from the water by means of the line, the port and the vent then being in such relative position that the water will pass out of the body portion through the vent opening and air will enter through the port opening while pulling the lure out of the water, this being aided by the position of the line attaching means, which will aid in tilting the lure to a position for discharge of the water therefrom as it leaves the water.

The forward end portion of the lure is preferably so made that it will not only create the impression of the head of a fish but will also aid in the water filling action of the lure by providing means that will tend to hold the head portion or forward end portion of the lure more deeply in the water as the lure is pulled along in the water.

Other objects and advantages of my invention will appear as the description of the drawings proceeds. I desire to have it understood, however, that I do not intend to limit myself to the particular details shown or described except as defined in the claims.

Figure 1:
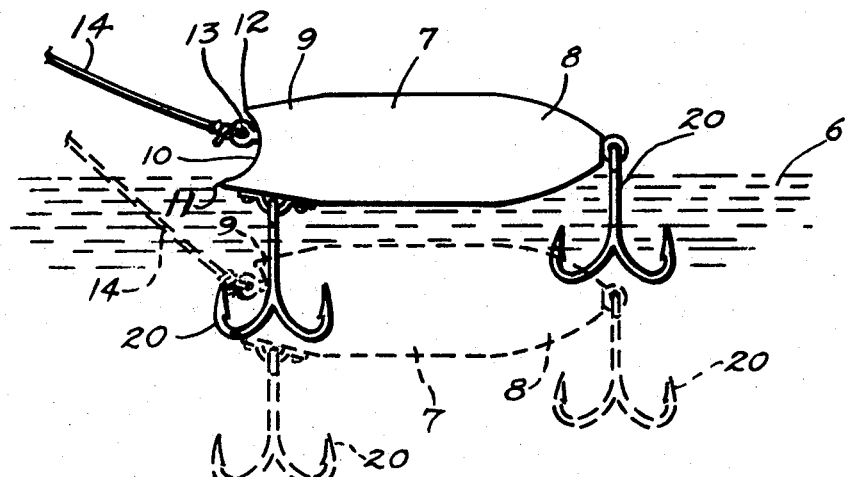
FIG. 1 is a view showing my lure in side elevation in the position it has when first cast into the body of water, and in dotted lines the position thereof as it is descending rapidly in the body of water.
Figure 2:
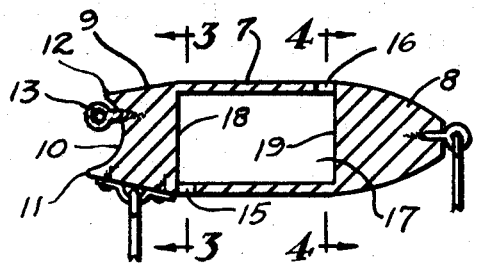
FIG. 2 is a longitudinal sectional view through my lure, portions thereof being shown in elevation.
Figure 3:
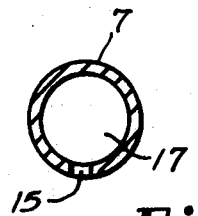
FIG. 3 is a section taken on the line 3—3 of FIG. 2.

Referring in detail to the drawings, my improved fishing lure is shown in full lines in FIG. 1 as it would be located in a body of water immediately after it has been cast into the same, the body of water being indicated at 6. Said lure has an elongated body portion having a central longitudinal or mid-portion 7 that is substantially cylindrical in character, being of uniform internal and external diameter, and with tapering solid end portions 8 and 9, the rear solid end portion 8 being not only convexly curved transversely, but also lengthwise, as will be obvious from FIGS. 1 and 2. The forward end portion 9 of the lure is also tapered in character, but is of substantially a truncated conical shape, as will be obvious from FIGS. 1 and 2. The forward end face 10 of the lure is preferably concavely curved as shown in the drawings, and said curvature is such that the forward end of the lure has a lower lip portion 11 and an upper lip portion 12 which lower lip portion projects a greater distance forwardly than the upper lip portion 12.

Any suitable means such as the screweye 13 is mounted in the solid forward end portion 9 of the lure eccentrically of the longitudinal axis thereof so as to be nearer the upper lip 12 than the lower lip 11, so that the line 14 will exert an upward pull on the lure at the forward end thereof when a pull is exerted on the line. The lower lip 11 is longer than the lip 12 so as to aid in keeping the lure on even keel while being pulled through the water along its surface, the tendency of the lip 11 being to exert a downward pull on the forward end of the lure counteracting a slight upward pull by the line.

The mid-portion of the body portion of the lure is provided with a port 15 for the intake of water and a vent 16 for the discharge of the air from the air chamber 17 formed within the hollow body of the mid-portion of the lure. The solid portions 8 and 9 extending lengthwise of the body portion are made of such material and the air chamber 17 is of such size that the lure will float as shown in FIG. 1, in full lines, as long as no water has entered the air chamber 17. However, as soon as the lure is lowered into the water the water will enter through the port 15 into the chamber 17 and will cause the chamber 17 to fill rapidly. The rate at which the chamber 17 is filled is controlled by the cross sectional size of the port 15 and the vent 16. It has been found desirable to make the vent 16 slightly larger than the port 15. A relative size for such port and vent that has been found suitable being 3/32 inch in diameter for the port and 9/64 inch in diameter for the vent.

Figure 5:
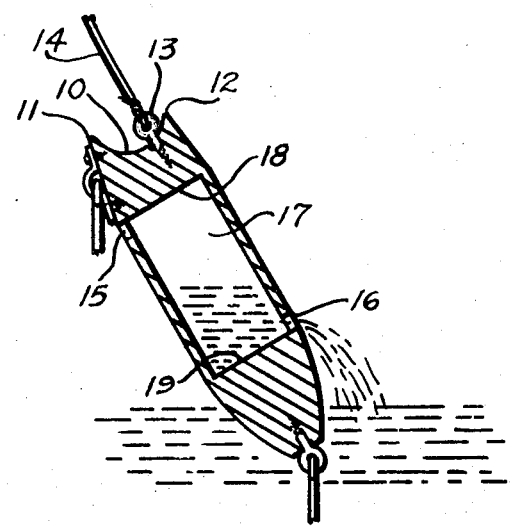
FIG. 5 is a view of the lure in longitudinal section showing the same as it is being pulled out of the water.
Figure 4:
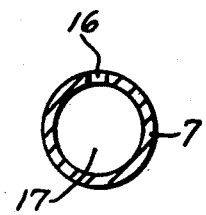
FIG. 4 is a section taken on the line 4—4 of FIG. 2.

With the hollow mid-portion of the lure somewhat greater in length than the two end portions, and with the port and vent openings arranged as above described, the lure will fill quite rapidly with water upon reaching the position on the surface of the water indicated in full lines in FIG. 1, and will sink rapidly downwardly in the body of water going through the position shown in dotted lines in FIG. 1. The distance that the lure is permitted to drop in the water can be determined by the fisherman by means of the line 14. After the lure has reached the desired depth in the water then it should be removed. During the movement of pulling the same out of the water the chamber 17 will be emptied of water as soon as it passes out of the water and into the air, the lure then having the position shown in FIG. 5, air then entering through the port 15 and the water being discharged from the chamber 17 through the vent 16.

It will be noted that there are no pockets, recesses or offsets in the walls of the chamber, the longitudinal walls being smoothly curved and the walls 18 and 19 being flat and extending perpendicularly to the axis of the cylindrical chamber 17 at a substantial distance from the ends of said lure. Thus, there is nothing to interfere with the rapid filling of the chamber 17 completely with water to obtain the above referred to action. Any desired arrangement of hooks on the lure can be provided, the hooks 20 being shown as being attached to the lure at the rear tapered end of the rear solid end portion 8 and to the bottom side of the forward solid end portion 9.

What I claim is:

1. A lure having an elongated body portion, said body portion having solid end portions extending lengthwise of the body portion and a hollow mid-portion providing a central air chamber in said body portion elongated lengthwise of said body portion and of uniform bore from the forward end thereof to the rear end thereof, the walls of said chamber being closed except for an inlet port at the forward end thereof, and a vent at the rear end thereof, said port being located in the bottom wall and said vent extending through the top wall of said chamber and opening onto said chamber at the top thereof into said lure becomes water borne, said vent being in a position to expel all the air from said chamber as said chamber fills completely with water entering through said port to sink said lure rapidly while maintaining it in a horizontal position.

2. The fishing lure claimed in claim 1 in which said vent is slightly greater in cross section than said port.

3. The fishing lure claimed in claim 1 in which said ends taper and said mid-portion is substantially cylindrical and greater in length than said end portions.

4. The fishing lure claimed in claim 1 in which said end portions taper and said mid-portion is substantially cylindrical, and the end walls of said chamber are flat and perpendicular to the axis thereof, and spaced a substantial distance from the ends of said lure.

5. The fishing lure claimed in claim 1 in which said end portions taper and said mid-portion is substantially cylindrical, and the end walls of said chamber are flat and perpendicular to the axis thereof, and spaced a substantial distance from the ends of said lure, and said vent is slightly greater in cross section than said port.

* * * * *